Nov. 5, 1963 R. OCKO 3,109,991

AUDIO LIMITER FOR PHASE MODULATION CIRCUITS

Filed Dec. 15, 1955 2 Sheets-Sheet 1

INVENTOR:
RICHARD OCKO,

BY Julius J. Zaskalicky
HIS ATTORNEY.

AUDIO LIMITER FOR PHASE MODULATION CIRCUITS

Filed Dec. 15, 1955 2 Sheets-Sheet 2

INVENTOR:
RICHARD OCKO,
BY Julius J. Zaskalicky
HIS ATTORNEY.

United States Patent Office 3,109,991
Patented Nov. 5, 1963

3,109,991
AUDIO LIMITER FOR PHASE MODULATION CIRCUITS

Richard Ocko, Syracuse, N.Y., assignor to General Electric Company, a corporation of New York Filed Dec. 15, 1955, Ser. No. 553,370
5 Claims. (Cl. 328—171)

This invention relates to frequency and phase-modulation systems generally and more particularly to circuits for limiting the maximum frequency deviation of a carrier wave to predetermined limits.

In frequency-modulation systems, it is desirable for the sake of efficiency to obtain high percentage modulation and also to make effective use of the band width allocated for a particular communication. By modulating a carrier wave to the maximum allowable limits, a higher signal-to-noise ratio is assured at the receiver. However, it is essential that the frequency limits set by the Federal Communications Commission in the allocation of a channel be not exceeded. Exceeding these limits would cause an objectionable interference with other communication systems operating in nearby channels.

Because of the fact that the amplitude of the human voice in speech and also the amplitude of sound in the production of music vary over a considerable range, it is normally impossible to operate a transmitter to provide full modulation at all times. If too high an average modulation is attempted, over-modulation may occur in some instances, causing the carrier to exceed the frequency limits of the allocated channel. To prevent such occurrences and yet maintain a high average modulation, various limiting circuits have been devised to maintain the amplitude of the audio-modulating signals applied to the transmitter below the value which would cause over-modulation, in spite of occasional excessive increases in the speech or music.

In an amplitude-modulation system, providing over-modulation does not occur, the side frequencies generated do not deviate in frequency from the carrier by more than the maximum modulating frequency in the signal. Hence, by limiting the amplitude of the modulating signal to a value such that over-modulation cannot occur, the carrier wave can readily be maintained within the side frequency limits. In a frequency-modulation system, however, the frequency deviation is directly proportional to the amplitude of the modulating signal and independent of its frequency. The side frequencies generated are in a constant relationship to the frequency deviation of the carrier and accordingly, by limiting the amplitude of the modulating signal, the side frequencies generated can be maintained in the allocated limits.

In phase-modulation systems, the problem of limiting the amplitude of the modulating signal becomes more complicated than in the case of amplitude or frequency-modulation systems. This is due to the fact that in a phase-modulated wave, while the phase shift is independent of the modulating frequency and proportional only to the amplitude of the modulating signal, it causes an equivalent frequency deviation which is proportional to both the frequency and the amplitude of the modulating signal. Since the limits set by the Federal Communications Commission apply to the maximum frequency deviation and not to the maximum phase shift, the equivalent frequency deviation must be limited. Accordingly, it is insufficient to limit only the amplitude of the modulating signal because even with constant amplitude, over-modulation will occur at the higher frequencies, and it becomes necessary to limit the modulating signal to an amplitude which decreases proportionately with frequency of the modulating signal. In other words, the product of the amplitude by frequency in the modulating signal must be limited to a constant value. When this is accomplished, the equivalent frequency deviation in a phase-modulated transmitter is maintained within definite limits which can be determined to stay within the frequency allocation of the individual station.

The same problem is encountered in a frequency-modulation transmitter which utilizes phase modulation in its initial stages and further utilizes the equivalent frequency modulation thereby produced, to provide a frequency-modulated output. The frequency deviation again must be limited to the allocated channel.

A system proposed to this end comprises a means for pre-emphasizing components of the audio-modulating signal to increase their amplitudes as a direct linear function of their frequency, means for limiting the amplitude of said pre-emphasized components exceeding a predetermined amplitude to said predetermined amplitude, and means for deemphasizing the pre-emphasized and limited components to decrease their amplitudes as a direct linear function of their frequency. The effect of such a circuit is to limit the slope of the resultant output and, at the same time, vary the amplitude of the resultant output in inverse relationship with respect to frequency for those components exceeding a certain frequency times amplitude product.

In such circuits, it is usual to utilize a network including a reactance such as, for example, a resistance and capacitance connected in series in the order named between the high and low side of a pair of output terminals. In such a circuit, the variation in current flow through the capacitance in response to the applied voltage across the network is not linear with respect to the applied voltage, but is exponential. Accordingly, the resultant modulating signal has the effect of producing a resultant frequency deviation which includes short excursions beyond the frequency deviation limits within which most of the modulated signal is confined, thereby limiting the effective width of the channel through which communication may be had. Applicant's invention is directed to eliminating such effects, thereby making more effective use of channel allocations.

A principal object of my invention is to provide improvements in modulation-limiting circuits for phase and frequency-modulation systems.

Another object of my invention is to provide an improved modulation system for compensating for the higher modulating frequencies in a modulated signal so that the frequency channel allocation of the phase-modulated transmitter can be more effectively utilized.

Another object of my invention is to provide a modulation-limiting circuit for use in a phase-modulation system which will maintain equivalent frequency deviation of a carrier wave within predetermined limits.

A still further object of my invention is to provide a limiting circuit of the kind described above in which effective use is made of frequency channel allocations.

Briefly, in accordance with a preferred embodiment of the invention, an audio limiter for phase modulation circuits is provided comprising means for preemphasizing and limiting the audio signal, means for combining the unpreemphasized limited signal with the preemphasized limited signal and means for deemphasizing the combined signal.

For additional objects and advantages and for better understanding of the invention, attention is now directed to the following description and accompanying drawings and also to the appended claims in which the features of the invention believed to be novel are more particularly pointed out.

Figure 1:
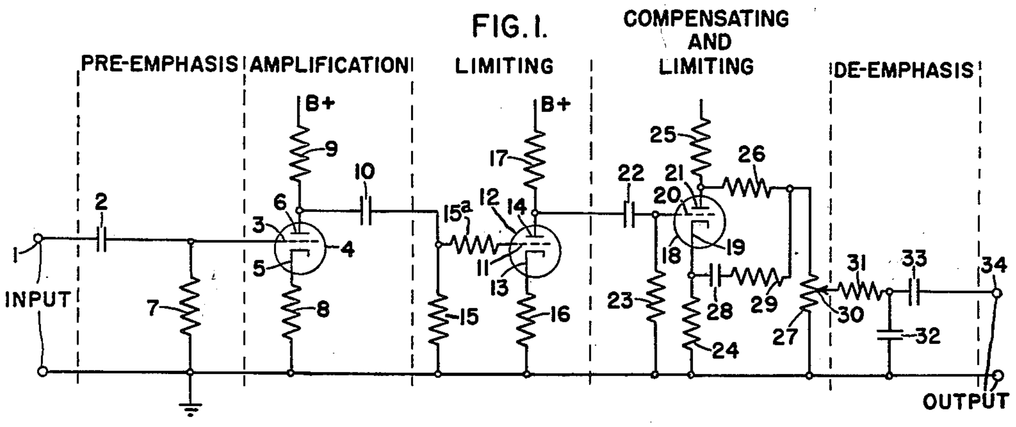
FIGURE 1 shows a schematic diagram of an illustrative embodiment of the limiting circuit of the present invention.
Figure 2:
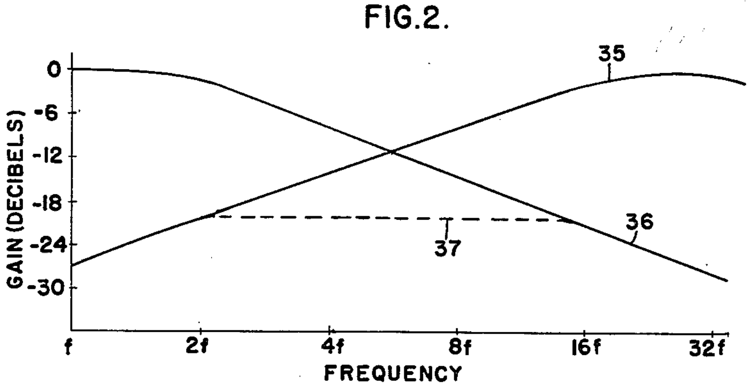
FIGURES 2 and 3 show graphs illustrating on a common frequency scale certain operating characteristics of the limiter circuit of FIGURE 1.

Referring now to FIGURE 1, there is shown an input terminal 1 adapted to receive a voltage from a source of modulating signals (not shown in the drawings). Terminal 1 is connected by capacitor 2 to the control electrode or grid 3 of device 4 of the electron discharge type having, in addition, a cathode 5 and an anode 6. The junction of capacitor 2 and grid 3 is connected to ground by a resistance 7 which constitutes in combination with capacitor 2 a preemphasis circuit for the higher signal frequencies. Capacitor 2 is selected so that over a predetermined range of frequencies, its reactance is considerably larger than the resistance of resistor 7. Accordingly, the voltage developed across resistor 7 increases substantially linearly with the frequency of the modulating signal as illustrated by graph 35 of FIGURE 2. Device 4 has its cathode 5 connected to ground through a resistor 8 and its anode 6 is provided with operating potential from a source of operating potential B+ through a resistor 9. Device 4 operates as a linear amplifier and provides an amplified output having an amplitude proportional to the amplitude of the signal applied to control grid 3.

The amplified signal voltage at the anode 6 is coupled by means of a capacitance 10 and a current limiting resistance 15*a* to the control electrode or grid 11 of device 12 of the electron discharge type having a cathode 13 and an anode 14. Grid 11 is connected to ground through resistances 15*a* and 15 while cathode 13 and anode 14 are connected to ground and to source of operating potential B+ by means of resistances 16 and 17, respectively. The resistances 16 and 17 are chosen to limit the amplitude of the output voltage when the amplitude of the voltage at grid 11 exceeds a predetermined level. The limiting of the amplitude of the output signal on positive half-cycles of the input voltage occurs through conduction of current to the grid 11 when its potential becomes sufficiently positive, while on negative half-cycles the limiting of the amplitude of the output voltage occurs because of anode current when the potential of the grid 11 becomes sufficiently negative.

Figure 5:
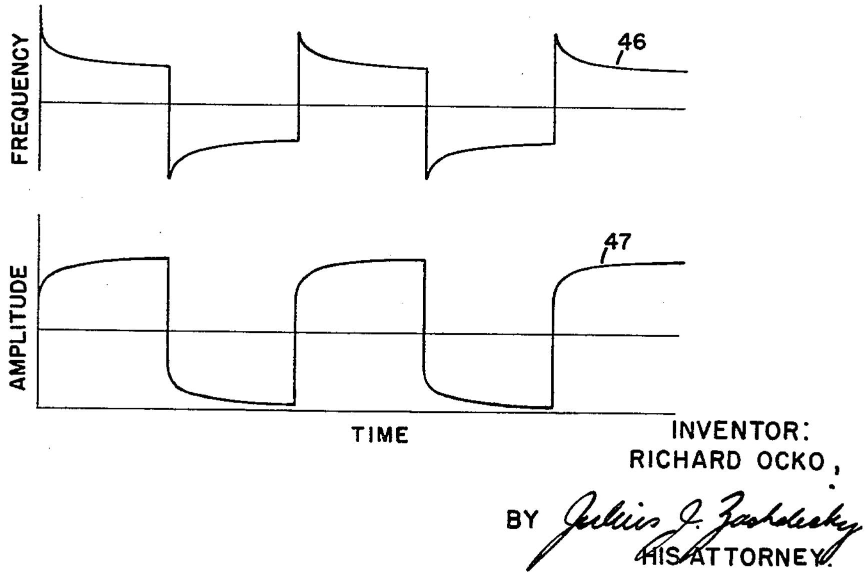
FIGURE 5 shows a pair of graphs on a common time scale useful in explaining applicant's invention, one of said graphs representing frequency deviation and the other representing modulating voltage.

The voltage at the anode 14 of device 12 is applied to a compensating circuit including a device 18 of the electron discharge type, including a cathode 19, a grid 20 and anode 21. The grid 20 is connected through coupling capacitor 22 to the anode 14 of device 12 and also through grid leak resistance 23 to ground. Cathode 19 is connected through cathode resistance 24 to ground. The anode 21 is connected through anode load resistance 25 to source of operating potential B+. The anode 21 is connected through combining and isolating resistance 26 to one end of resistive potentital divider 27, the other end of which is connected to ground. Cathode 19 is connected through differentiating capacitor 28 and resistance 29 in series to the ungrounded side of resistive potential divider 27. Capacitance 28, resistance 29 and the resistance of resistive potential divider 27 are chosen to produce a differentiation or preemphasis of the signal obtained from the output of the limiter 12. This differentiated signal appears across the divider 27. Also, across resistive potential divider 27 appears the output from the anode 21 of device 18. Accordingly, across resistive potential divider 27 is obtained a signal which is partially compensated as shown at 47 in FIGURE 5 and will be further described below. It should also be observed that cathode current cut-off limiting occurs in device 18.

The movable tap 30 of resistive potential divider 27 is connected through a resistance 31 to one side of the capacitance 32, the other side of which is connected to ground. Resistance 31 and capacitance 32 together comprise a deemphasis or integrating circuit. Resistance 31 is selected to have over a predetermined band of frequencies a resistance substantially greater than the reactance of capacitance 32. As a result, the voltage developed across capacitance 32 is substantially inversely proportional to the frequency of the signal supplied from the tap 30. This inverse relationship is illustrated by graph 36 of FIGURE 2. The output voltage at the junction of resistance 31 and capacitance 32 is coupled by means of a capacitance 33 to the terminal 34, the output terminal.

In operation, as previously stated, the output voltage of the preemphasis circuit, i.e. resistance 7 and capacitance 2, varies with frequency in accordance with graph 35. Likewise, the output voltage of the deemphasis circuit, i.e. resistance 31 and capacitance 32, varies with frequency in accordance with graph 36. Considering now the output voltage of the deemphasis circuit with respect to the voltage at the input of the preemphasis circuit, the resultant output voltage is in accordance with graph 37 of FIGURE 2 which is the result of graphs 35 and 36 combined. Graph 37 coincides with graph 35 in the frequency range *f* to 2*f* and with graph 36 in the frequency range 16*f* to 32*f*.

Figure 3:
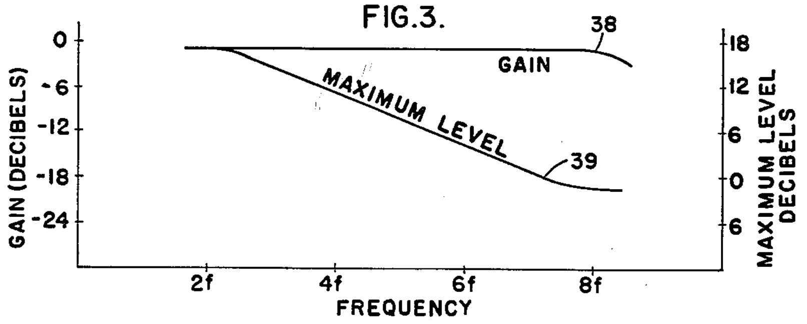

In the intermediate range from frequency 2*f* to 16*f*, graph 37 is essentially flat and the amplitude of the output voltage at terminal 34 is essentially constant with respect to the amplitude of the input voltage at terminal 1. Referring to FIGURE 3, this relation is further illustrated by graph 38, indicating the gain of the amplifier as essentially constant for all values of input signal below the limiting level.

The limiting action of device 12 occurs when the input voltage to grid 11 exceeds this predetermined value. However, the input voltage at grid 11 is proportional to the product of the amplitude and the frequency of the input signal at terminal 1. Accordingly, limiting occurs when this product exceeds the predetermined value determined by cathode and anode resistors 16 and 17 and limiting action in device 18. The output voltage at anode 21 of device 18 is compensated by the compensating circuit, i.e. capacitance 28 and resistance 29, and then is integrated or deemphasized by the deemphasis circuit so that the final output voltage at the terminal 34 is substantially inversely proportional to the frequency of the modulating signal. Thus, the signal at the anode 21 of device 18 is limited with respect to the input voltage at its grid 20 to a constant value which is independent of frequency. However, with respect to the input voltage at terminal 1, the limit decreases with increasing frequency and is constant only with respect to the product of amplitude by frequency. The output voltage at terminal 34 can then never exceed a certain maximum level as illustrated by graph 39 of FIGURE 3. When this output voltage is utilized to modulate a phase-modulation system, the equivalent frequency deviation, proportional to the product of amplitude and frequency of the modulating signals, is limited and can never exceed a predetermined value.

Figure 4:
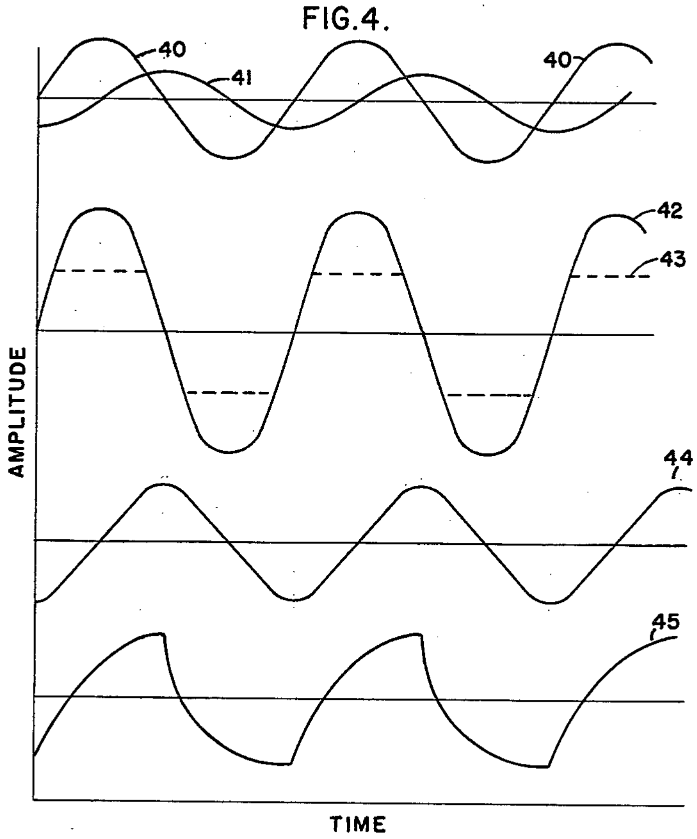
FIGURE 4 shows graphs, on a common time scale, including certain voltages appearing in different parts of the circuit of FIGURE 1.

Referring to FIGURE 4 and assuming a sine wave input of constant amplitude and frequency, graph 40 illustrates the wave form of voltage at the anode 14 of device 12 when the input voltage is below the limiting level. Graph 41 illustrates the output at terminal 34 for this condition of input voltage. The solid graph 42 illustrates the wave form of input voltage to the device 12, having an amplitude which is above the amplitude limiting level of devices 12 and 18. The dotted graph 43 illustrates the wave form of the voltage at the anode 21 of device 18 for this condition. The positive and negative peaks of the wave have been clipped off through grid current flow and anode current cut-off respectively, in devices 12 and 18. Graph 44 illustrates the output at terminal 34 caused by a wave form such as illustrated by graph 43 as being applied to the deemphasis circuit, resistance 31 and capacitance 32. The wave form of graph 43 is almost a rectangular wave and contains high-frequency components representing distortion of the original wave. In graph 44, the rectangular wave form has been integrated after having been compensated by the compensating circuit into a wave of constant maximum slope in which the high-frequency distortion components are very much reduced. The slope is fixed by the rate of charge of capacitance 32 through resistance 31 and remains independent of the frequency of the signal. This insures a definite limit to the equivalent frequency deviation resulting from the phase modulation of a carrier wave with this signal. In the absence of a compensating circuit, a wave form of the kind shown in graph 45 results due to the fact that the charge and discharge of capacitance 32 through resistance 31 is not at a linear rate but at an exponential rate. It is because of this fact that the resultant frequency deviation produced in a phase-modulation system is such as illustrated in graph 46. In this graph, the peak portions result from the fact that the slope of the modulating wave corresponding thereto is greater than would be obtained with a linear variation between the peaks of the graph 45. Since the peaks of the envelope 46 must be set to lie within the frequency spectrum of the channel, and since most of the time only a portion of the channel represented along the ordinate of this graph is utilized, ineffective use is made of the channel allocation. The effect of applicant's circuit is to combine the limited wave shown in graph 43 with a differentiated or compensated wave to produce a resultant wave of the form shown in graph 47 which includes a rounded top portion as shown. When a wave of the form shown at 47 is applied to the deemphasis network comprising resistance 31 and capacitance 32, there is produced an output represented by graph 44. Accordingly, the aforementioned frequency deviation peaks are eliminated from the frequency-modulation envelope, thereby obtaining effective use of the channel of communication.

While a particular embodiment of the present invention has been shown, it will, of course, be understood that I do not wish to be limited thereto, since many modifications, both in circuit arrangement and in the instrumentalities employed may be made, and I, therefore, contemplate by the appended claims to cover any such modifications as fall within the true spirit and scope of my invention.

What I claim as new and desire to secure by Letters Patent of the United States are:

1. Apparatus for limiting a signal containing components occurring within a predetermined band of frequencies comprising means for providing a relative amplification of said components which increases linearly with their frequency, means for limiting the amplitude of said amplified components to a fixed value, means for deriving from said limited signal a composite signal including said limited signal and said limited signal in which the amplitude increases linearly with frequency, and means for deriving from said composite signal a signal in which the relative attenuation of said limited components increases linearly with their frequency.

2. Apparatus for limiting the product of instantaneous amplitude and instantaneous frequency developed from a signal containing components occurring within a predetermined band of frequencies comprising means for preemphasizing said components to increase the relative amplitudes of said components as a direct linear function of the frequency of said components, means for limiting said preemphasis components to a constant amplitude irrespective of their frequencies, means for preemphasizing said limited components and means for deemphasizing said limited and said preemphasized limited components to increase the relative amplitude of said components as an inverse of the function of their frequencies.

3. A circuit for limiting the product of instantaneous amplitude and instantaneous frequency of a signal containing components occurring within a predetermined band of frequencies comprising means for attenuating decreasingly with increases in frequency the amplitude of said components, means for limiting the amplitude of said attenuated components to a fixed value, means for attenuating decreasingly with increases in frequency the amplitude of said limited components, means for combining said limited components and said limited and attenuated components to obtain a resultant signal, and means for attenuating increasingly with increases in frequency the amplitude of said resultant signal.

4. A circuit for limiting the product of instantaneous amplitude and instantaneous frequency of a signal containing components occurring within a predetermined band of frequencies comprising means for preemphasizing said components to increase their amplitudes as a direct linear function of their frequency, a constant amplitude limiting circuit for limiting any of said preemphasized components exceeding a predetermined amplitude to said predetermined amplitude, means including a preemphasizing network for preemphasizing the output of said limiting circuit, means for combining the output from said limiting circuit with the preemphasized output of said limiting circuit, means for applying said combined output to a deemphasizing network including a resistance and capacitance connected in series, and means for deriving an output across said capacitance.

5. Signal limiting apparatus comprising means for preemphasizing a signal, means for limiting the preemphasized signal, means for preemphasizing the limited signal, combining means for combining the limited signal and the preemphasized limited signal, and means for deemphasizing the combined signal.

References Cited in the file of this patent

UNITED STATES PATENTS

| | | |
|---|---|---|
| Re. 24,110 | Winkler | Jan. 17, 1956 |
| 1,992,044 | Saxton | Feb. 19, 1935 |
| 2,105,538 | Landon | Jan. 18, 1938 |
| 2,113,224 | Schantz | Apr. 5, 1938 |
| 2,220,260 | Meier | Nov. 5, 1940 |
| 2,353,672 | Keck et al. | July 18, 1944 |
| 2,566,876 | Dome | Sept. 4, 1951 |
| 2,731,595 | Gamerstfelder | Jan. 17, 1956 |

OTHER REFERENCES

Electronics article, "Instantaneous Deviation Control," September 1949, pages 97, 98, 99.